July 21, 1970 W. R. TAYLOR 3,521,085
RESONANT BRIDGE DEVICE
Filed March 25, 1968 2 Sheets-Sheet 1
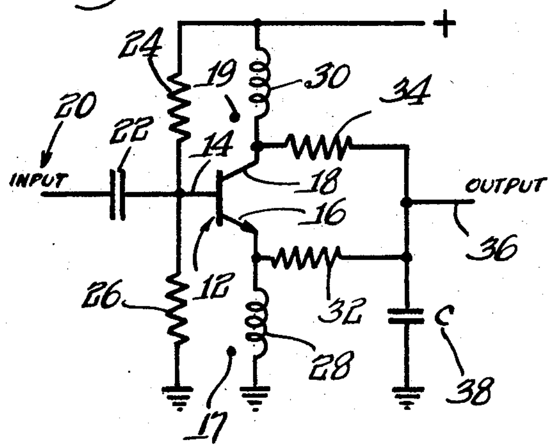
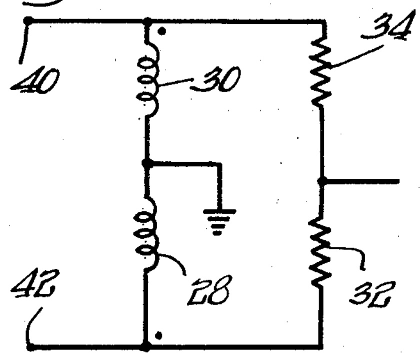
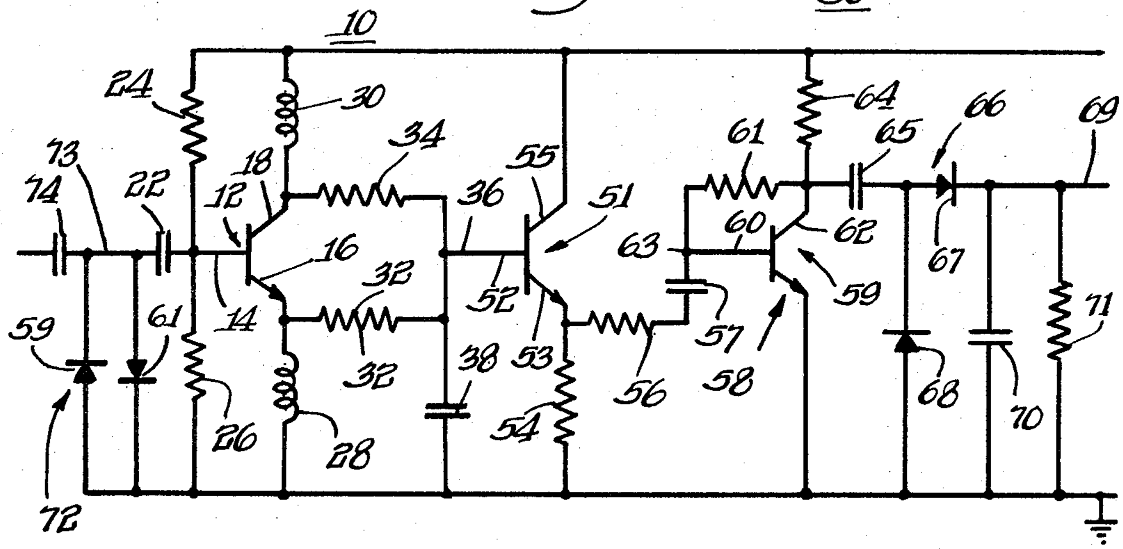
Fig. 4.
Inventor
William R. Taylor
By: Olson, Trexler, Wolters & Bushnell Attys.

RESONANT BRIDGE DEVICE
Filed March 25, 1968 2 Sheets-Sheet 2
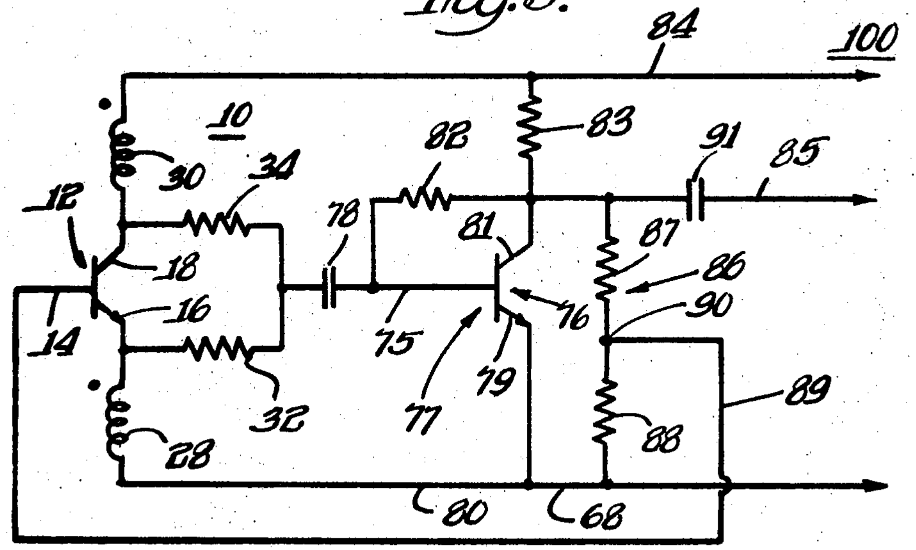
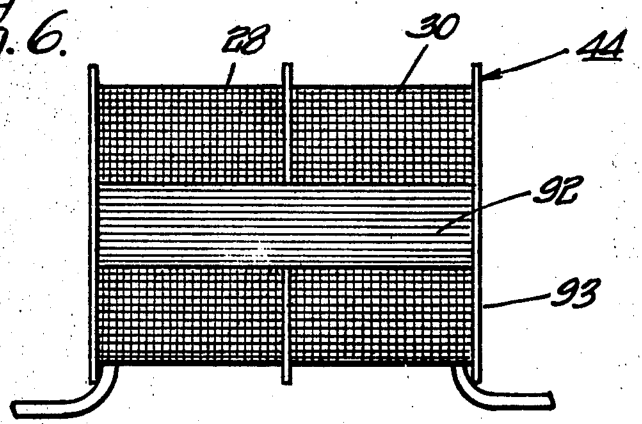
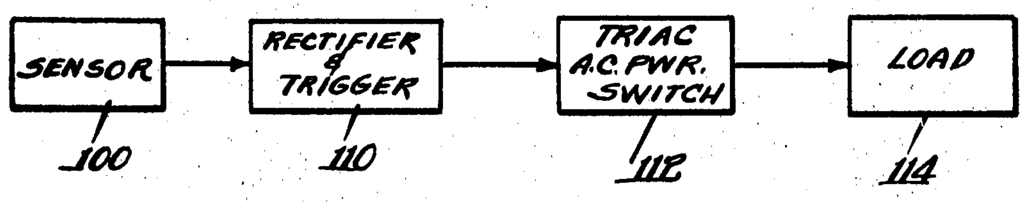
Inventor
William R. Taylor
By: Olson, Trexler, Wolters & Bushnell Attys.

United States Patent Office 3,521,085
Patented July 21, 1970

1

3,521,085
RESONANT BRIDGE DEVICE

William R. Taylor, Buffalo, N.Y., assignor to Perry Laboratories, Inc., Buffalo, N.Y., a corporation of New York
Filed Mar. 25, 1968, Ser. No. 715,709
Int. Cl. H03b *3/04*
U.S. Cl. 307—233 12 Claims

ABSTRACT OF THE DISCLOSURE

A transistor driven resonant bridge circuit device comprising a pair of coils having similar impedance versus frequency characteristics; a first one of the coils connected to the emitter and a second one of the coils connected to the collector of the transistor, the base of the transistor comprising the input of the bridge circuit; and a pair of resistors interconnected at one end thereof to form the output of the circuit and connected at the other end thereof to the emitter and collector, respectively, of the transistor driver. The bridge circuit in one form, with the aid of detection circuitry coupled thereto, may be used as a contactless decoder and in another form as a magnetic sensor circuit.

This invention relates to resonant bridge devices.

It is a general object of this invention to provide a new and improved transistor driven bridge circuit and apparatus.

It is a further object of this invention to provide a bridge circuit of the above type which may be used with detection circuitry to provide a contactless decoding module.

It is yet another object of this invention to provide a new and improved bridge circuit which can be used with amplification and feedback circuitry to provide a magnetic sensing device.

It is still another object of this invention to provide a sensing device of the above type which can be used with a rectifier circuit and power switch to power a load.

A better understanding of the present invention and its organization and construction may be had by referring to the description below in conjunction with the accompanying drawings of which:

FIG. 1 is a circuit diagram of a transistor driven bridge circuit according to the invention;

FIG. 2 is a Thevenin's equivalent circuit diagram of the circuit of FIG. 1 illustrating the bridge configuration;

FIG. 3 is the circuit of FIG. 1 being used with a detector circuit to provide a contactless decoding device;

FIG. 4 is an axial sectional view of a coil wound bobbin, illustrating the physical apparatus of the coils of the bridge circuit of FIG. 1 as used in the contactless decoding device of FIG. 3;

FIG. 5 is the circuit of FIG. 1 used in conjunction with an amplifier-feedback circuit to provide a sensor device;

FIG. 6 is an axial sectional view of a coil wound bobbin illustrating the physical apparatus of the coils of the bridge circuit as used in the sensor device of FIG. 5; and FIG. 7 is a block diagram illustrating the use of the sensor circuit of FIG. 5 with additional circutry to power a load.

Referrng now to the drawings in more detail, and first to FIG. 1, a transistor driven bridge circuit 10 according to the invention includes a driving transistor 12, here shown as an NPN type, having a base 14, emitter 16 and collector 18. The base 14 of the transistor is connected to an input 20 through a capacitor 22 and to the

2 junction of a pair of series-connected voltage divider resistors 24 and 26; the resistor 24 also being connected to a positive potential and the resistor 26 being grounded. The emitter 16 and collector 18 of transistor 12 are connected to respective coils 28 which are in turn connected to ground and to a positive potential, respectively. Emitter 16 and collector 18 are also connected to respective resistors 32 and 34 which are interconnected at the other side thereof and are thereat connected to output 36. Connected between the output 36 and ground is a capacitor 38 to shunt out high frequency bridge output signals that might be caused by noise, etc., inputs acting on coils that might have differing high frequency impedances due to random winding. The starting point (corresponding ends) of the respective windings of coils 28 and 30 is indicated in FIG. 1 of the drawings by the marks 17 and 19.

FIG. 2 of the drawings illustrates the Thevenin's equivalent circuit of FIG. 1, drawn to show the bridge structure of coils 28 and 30 and resistors 32 and 34. The beginning of the respective coils again is indicated clearly to show the relation of the circuit diagrams of FIGS. 1 and 2. The emitter and collector of the transistor 12 shown in FIG. 1 which serves to drive the circuit (not shown in FIG. 2) are to be connected at points 40 and 42, respectively, in the circuit diagram of FIG. 2. Note that one end of the coil 30 is at A.C. ground through the power supply.

The circuit of FIGS. 1 and 2 may be used in the decoding of audio signals. As can be seen in FIG. 4 of the drawings, which illustrates the physical structure of the bridge device when used in this manner, coils 28 and 30 are wound on a bobbin 44. The collector coils 30 is wound on the right half of the bobbin, and the emitter coil 28 is wound on the left half of the bobbin with a separating flange 43 therebetween. In the case of a decoder, a vibrating reed 46 connected to a mounting base at the left hand end of bobbing 44 is provided therein. The reed is fixed at end 47 and is movable at its free end 48 within the coils.

Both coils 28 and 30, which as described above are wound on the same bobbin, have equal impedance versus frequency characteristics over the audio range. Consequently, for input amplitudes within the linear operation range of transistor 12, (the drive transistor of the bridge) each coil is driven with identical signals, but 180 degrees out of phase. These out of phase signals add to zero at the junction of resistances 32 and 34, as shown in FIGS. 1 and 2, which are of equal magnitude and therefore the output of the bridge circuit is near zero for all inputs of frequencies that result in equal coil impedance. It will be noted that high frequencies tend to unbalance the circuit due to random coil winding capacitances, however, capacitor 38 reduces these outputs to near zero.

Used as a decoder, for input frequencies within the designed band width of the device (at or near the natural frequency of vibration of the reed), the reed 46 vibrates accordingly. This resultant reed action, as shown in dotted lines in FIG. 4, changes the coil impedance in the collector circuit. This can be seen in FIG. 4 wherein the free end 48 of the reed 46 moves back and forth in the center of coil 30 of a great deal, but moves a negligible amount within emitter coil 28. The impedance change in coil 30 results in a 25 to 35 decibel change in output of the circuit. The impedance of the emitter is inherently low, and changes in impedance of coil 28 have little effect. The coil 30 is in a position in the circuit to have greater effect, and the impedance change in coil 30 causes the circuit to become an amplifier. Therefore, over the design band width, there is substantial output to detect.

Various detection means may be employed. One practical circuit arrangement for so doing is shown in FIG. 3 of the drawings connected to the bridge circuit of FIG. 1. The detecting circuit 50 following the circuit of FIG. 1 comprises transistor 51, here shown as an NPN type, connected in emitter follower configuration and including a base 52 connected to the output 36 of the circuit 10, an emitter 53 connected through a resistor 54 to ground and a collector 55 connected to a positive voltage potential. A resistor 56 connected to the emitter provides an emitter coupled output from transistor 51 through capacitor 57 to an amplifying circuit 58. The emitter follower couples the high output impedance of the bridge to the low input impedance of the amplifier circuit 58. The amplifier circuit 58 includes a transistor 59, also an NPN type, having a base 60 coupled by means of a resistance 61 to collector 62 of the transistor 59 and in turn connected to the output of emitter follower transistor 51 through capacitor 57 and junction 63. A resistor 64 couples the collector 62 to the positive voltage potential. The output of the amplification state 58 passes through capacitor 65 and through a rectifier circuit 66 including a pair of diodes 67 and 68, the diode 68 being coupled between the output connection 69 and ground. A capacitor 70 and a resistance 71 are likewise coupled in parallel relation between the output connection 69 and ground. The rectifier circuit 66 serves to produce a DC output response at output 69 of the circuit, and the response band width of the circuit may be adjusted by resistor 56, if necessary. Indicating means (not shown) may be added to the detection circuitry to indicate the corresponding output or change therein.

A diode limiter 72 including diodes 59 and 61 connected between the input lead 73 and ground, prior to the bridge circuit 10, is provided to prevent overdriving of the bridge transistor 12. If the transistor 12 were overdriven, unequal signals would develop at the collector and emitter, resulting in unwanted output. The diode circuit 72 also provides constant band width output response for predetermined input voltages. The input capacitor 74 is a high pass filter which prevents one-third frequency response.

Thus, through the bridge circuit 10 of FIG. 1, coupled with the detection circuitry 50, as shown in FIG. 3, audio signals can be decoded using resonance signals without the necessity of mating contacts.

The transistor driven bridge circuit 10 of FIGS. 1 and 2 also may be used as a proximity switch or magnetic sensing device such as 100 of FIG. 5 of the drawings.

Referring to FIG. 5, the circuit 10 is connected to the base electrode 75 of a transistor 76 comprising an amplifying stage 77, through a capacitor 78. The transistor 76 also includes an emitter 79 connected to ground potential at lead 80, and a collector 81 of transistor 76 coupled by means of resistor 82 to the base 75 as well as through a resistor 83 to a positive voltage potential at lead 84. The output from the amplification stage 77 is derived at the collector 81 of transistor 76. Connected between output 85 and ground lead 80, subsequent to the amplification stage 77, is a voltage dividing network 86, including a pair of series connected resistors 87 and 88. A feed-back lead 89 is connected at a point 90 between resistors 87 and 88 and to the base electrode 14 of the drive transistor 12 of circuit 10. The resulting voltage output from the voltage dividing network 86 is thus fed back by means of lead 89 to drive transistor 12. A capacitor 91, as shown in FIG. 5, is connected in series with the output lead 85.

Referring now to FIG. 6, where the physical structure of the bridge is shown, the coils 28 and 30 are once again wound on a single bobbin 44. However, instead of using the magnetic reed 46 therein, as in the case of the decoder, iron laminations 92 are placed in the bobbin center. Thus, when the bridge, which is normally balanced, is unbalanced by the presence of magnetic material at one end 93 of the bobbin 44, so that there is an impedance change in coil 30, oscillation occurs. Drive transistor 12 becomes an amplifier and the output of the bridge, which is correctly phased, is inverted by the transistor 76 of amplifier stage 77 and is fed back to sustain oscillation.

Thus, the bridge circuit 10 according to the invention connected to the circuitry as shown in FIG. 5 of the drawings may also be employed as a proximity switch or magnetic sensing device 100. This type of device is useful in situations where the presence of magnetic material is required to be detected.

FIG. 7 illustrates in block diagram form a further use of the detector or sensor circuit 100 according to the invention. In FIG. 7 there is shown the sensing circuit 100 which is connected to a rectifier and trigger circuit 110 to change the AC output from the sensor to DC. The DC output from the rectifier trigger circuit provides the input to a triac AC power switch illustrated by block 112, which is turned on thereby and thus powers load 114 connected thereto.

Thus the bridge device according to the invention, with minor modifications, has various uses as illustrated above.

It will be obvious to those skilled in the art that changes and modifications, may be made without departing from this invention in its broadest aspects, and therefore the aim in the appended claims is to cover all such changes and modifications as come within the true spirit and scope of the invention.

What is claimed is:

1. A resonant bridge circuit comprising: a transistor including a base, emitter and collector, signal input means connected to said base, a first coil and first resistor of a predetermined value of resistance connected at first ends thereof to the emitter of said transistor, a second coil and second resistor having a resistance value equal to that of said first resistor connected at first ends thereof to the collector of said transistor, said coils having a like impedance versus frequency characteristic, the second end of said first coil connected to a source of positive potential and the second end of said second coil being grounded, and and output connected to the second ends of said first and second resistors, said bridge circuit normally being in a balanced state but becoming unbalanced upon the receipt at said input of signals of predetermined frequency, a corresponding output signal from said circuit being effected accordingly in response to said predetermined frequency signals.

2. A contactless decoder device comprising: a resonant bridge circuit including a transistor having a base, emitter and collector, an input connected to said base, a pair of coils having a similar frequency versus impedance characteristic, a first one of said coils being connected at a first end thereof to the emitter and a second one of said coils being connected at a first end thereof to the collector, and a pair of resistors having equal resistance values interconnected at first ends thereof to form the output of said bridge circuit and each connected at the second end thereof to the emitter and collector, respectively, and detection means connected to the output of said bridge circuit, whereby upon the receipt at said input of a predetermined signal frequency, a corresponding change in the balance of said bridge circuit is effected, said detection means detecting said charge and indicating said charge accordingly.

3. A contactless decoder as claimed in claim 2 wherein said coils and resistors of said bridge circuit are of predetermined values so that the bridge circuit includes a predetermined pass band width, and wherein the normal output of said bridge circuit is a predetermined value for all inputs of frequencies out of the design band width of said circuit, wherein inputs of frequencies within said band width cause corresponding values of output over and above said predetermined value.

4. A contactless decoder as claimed in claim 3 wherein said detection means includes coupling means connected to the output of said bridge circuit and amplifier means having an input and an output, the input of said amplifier means being connected to said coupling means and rectifier means connected to the ouptut of said amplifier means for producing a D.C. output response.

5. Sensor apparatus for detecting magnetic material comprising: a resonant bridge circuit including a transistor having a base, emitter and collector, a pair of coils having a similar frequency versus impedance characteristic, a first one of said coils being connected at a first end thereof to the emitter of said transistor and a second one of said coils being connected at a first end thereof to the collector of said transistor, and a pair of resistors having equal resistance values, interconnected at first ends thereof to form the output of said bridge circuit, and each connected at the other end thereof to the emitter and collector of said transistor, respectively; said bridge circuit being normally balanced with a zero output response, amplifier means having an input and an output, said input connected to the output of said bridge circuit; voltage divider means connected to the output of said amplifier; and feed back means connected between said voltage divider means and the base of said transistor of said bridge circuit, whereby upon the unbalancing of said bridge circuit due to the presence of magnetic material, an output response results at the output of said bridge circuit, said output response being amplified and fed back to said bridge circuit so that as long as said magnetic material is present an output response is effected.

6. Sensor apparatus as claimed in claim 5 wherein said coils are wound on a hollow center bobbin, said first coil being wound on a first half thereof and said second coil being wound on a second half thereof, said bobbin including in the center thereof a predetermined quantity of magnetizable material, whereby upon placing additional magnetic material adjacent said second half of said bobbin, the impedance of said second coil changes with respect to said first coil, thereby unbalancing said bridge circuit to effect an output response therefrom.

7. Detection apparatus comprising a transistor driver including a base emitter and collector, input signal means coupled to said base, a hollow center bobbin, a first coil wound about a first half of said bobbin and coupled to said emitter, a second coil wound about a second half of said bobbin and coupled to said collector, said coils having a similar impedance versus frequency characteristic, magnetizable material positioned in a predetermined manner with respect to said coils within said hollow center, an input connected to said emitter and collector, so that upon a predetermined change in relation between said magnetizable material and said coils, the relative impedance of said coils charges a predetermined amount and a corresponding output is effected.

8. Detection apparatus as claimed in claim 7 including a pair of resistors connected between said output and said transistor in parallel relation to each other, a first one of said resistors being connected between said emitter and said output and a second one of said resistors being connected between said collector and said output, said coils and said resistor forming a bridge configuration.

9. Detection apparatus as claimed in claim 8 wherein said magnetizable material within said bobbin center comprises a reed secured at one end thereof within said first bobbin half and movable within said second bobbin half, whereby upon the receipt at said input of said transistor of certain predetermined frequency signals, said reed vibrates within said hollow bobbin center causing a change in impednace of said collector coil to in turn cause a corresponding output response, said apparatus further including means for detecting said response from the output of said apparatus.

10. Detection apparatus as claimed in claim 9 wherein said detection means includes amplifier means connected to said output at the input side of the former and connected to rectifier means at the output thereof to change said output signal to a D.C. output response.

11. Detection apparatus as claimed in claim 8 wherein said magnetizable material include a first predetermined quantity thereof extending within said bobbin center from one end thereof to the other end thereof, so that upon the addition of a second predetermined quantity of magnetic material at one end of said bobbin, the impedance of said corresponding coil is changed with respect to the other coil, thereby to cause a corresponding output response, said detection apparatus further including feed back means connected at the output thereof and to the base of said transistor to feed back said output response from the former to the latter while the impedance of the coils remains dissimilar.

12. Detection apparatus as claimed in claim 11 further including rectifier and trigger means connected to the output of said circuit, a power switch connected in series with said rectifier and trigger means; and a load connected to said power switch whereby the output of said detection apparatus is rectified to operate said power switch and in turn to drive said load.

References Cited

UNITED STATES PATENTS

| | | | |
|---|---|---|---|
| 3,018,381 | 1/1962 | Carroll et al. | 328—140 XR |
| 3,154,745 | 10/1964 | Begeman et al. | 307—295 XR |
| 3,296,537 | 1/1967 | Korpel | 328—140 |
| 3,413,560 | 11/1968 | Van Anrooy | 307—233 XR |

STANLEY T. KRAWCZEWICZ, Primary Examiner

U.S. Cl. X.R.

307—295, 309; 324—41; 328—119, 140; 331—65; 340—171, 199